United States Patent
Nakano et al.

(12)

(10) Patent No.: US 10,114,169 B2
(45) Date of Patent: Oct. 30, 2018

(54) DISPLAY DEVICE

(71) Applicant: Funai Electric Co., Ltd., Osaka (JP)

(72) Inventors: Kodai Nakano, Osaka (JP); Tatsuji Sudo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/249,471

(22) Filed: Apr. 10, 2014

(65) Prior Publication Data

US 2014/0307204 A1 Oct. 16, 2014

(30) Foreign Application Priority Data

Apr. 12, 2013 (JP) .................................. 2013-084396

(51) Int. Cl.
*G02F 1/1333* (2006.01)
*G02F 1/1335* (2006.01)
*F21V 8/00* (2006.01)

(52) U.S. Cl.
CPC ......... *G02B 6/0088* (2013.01); *G02B 6/0085* (2013.01)

(58) Field of Classification Search
USPC ...... 349/58–67; 362/600–632; 348/790, 794, 348/836
See application file for complete search history.

(56) References Cited

U.S. PATENT DOCUMENTS

| | | | | |
|---|---|---|---|---|
| 8,049,834 B2* | 11/2011 | Mo | ......................... | G02B 6/005 |
| | | | | 349/58 |
| 8,724,047 B2* | 5/2014 | Yu | ...................... | G02F 1/133615 |
| | | | | 349/58 |
| 2008/0130315 A1* | 6/2008 | Song | ..................... | G02B 6/0091 |
| | | | | 362/617 |
| 2009/0103328 A1* | 4/2009 | Iwasaki | ................ | G02B 6/0041 |
| | | | | 362/617 |

(Continued)

FOREIGN PATENT DOCUMENTS

| | | |
|---|---|---|
| CN | 102494276 A | 6/2012 |
| EP | 2202457 A2 | 6/2010 |

(Continued)

OTHER PUBLICATIONS

Extended European Search Report issued in counterpart European application No. 14163891.6 dated Jun. 2, 2014 (5 pages).

(Continued)

*Primary Examiner* — Edward Glick
*Assistant Examiner* — David Chung
(74) *Attorney, Agent, or Firm* — Osha Liang LLP (57) ABSTRACT

A display device includes a display panel, a light source that emits light, a light guide plate comprising a lateral surface that receives the light, wherein the light source emits the light to the lateral surface from a main surface to a back surface of the display panel, a supporting member provided between a peripheral portion of the display panel and a peripheral portion of the light guide plate and that supports (Continued)

the peripheral portion of the display panel, a reflective sheet disposed so as to cover a back surface on an opposite side of the main surface of the light guide plate and that comprises an opening at a position corresponding to the peripheral portion of the light guide plate, and a back surface enclosure disposed so as to oppose the reflective sheet and that includes a first fixing part and a second fixing part.

13 Claims, 6 Drawing Sheets

(56) References Cited

U.S. PATENT DOCUMENTS

| | | | |
|---|---|---|---|
| 2009/0207560 A1* | 8/2009 | Lee | H01L 51/5237 361/679.01 |
| 2009/0231513 A1 | 9/2009 | Ohta et al. | |
| 2009/0303409 A1* | 12/2009 | Park | G02F 1/133308 349/58 |
| 2011/0109844 A1* | 5/2011 | Go | G02F 1/133308 349/65 |
| 2011/0141396 A1 | 6/2011 | Nakamura et al. | |
| 2011/0261276 A1* | 10/2011 | Yu | G02B 6/0028 349/16 |
| 2012/0086882 A1* | 4/2012 | Itoh | G02F 1/336 349/58 |
| 2012/0250354 A1 | 10/2012 | Yoshida | |
| 2012/0262634 A1* | 10/2012 | Takano | G02B 6/0055 348/790 |
| 2012/0281151 A1* | 11/2012 | Abe | G02B 6/0091 348/739 |
| 2013/0002979 A1 | 1/2013 | Nakamura | |
| 2013/0141670 A1 | 6/2013 | Yang et al. | |
| 2014/0176867 A1* | 6/2014 | Huang | G02B 6/0081 349/65 |
| 2014/0293136 A1* | 10/2014 | Mouri | G02B 6/009 348/725 |
| 2014/0340875 A1* | 11/2014 | Hayashi | G02F 1/133308 362/97.1 |

FOREIGN PATENT DOCUMENTS

| | | |
|---|---|---|
| JP | 2001-117084 A | 4/2001 |
| JP | 2011-249331 A | 12/2011 |
| JP | 2012-133771 A | 7/2012 |
| JP | 2012-208254 A | 10/2012 |
| JP | 2013-258071 A | 12/2013 |
| WO | 2011/081013 A1 | 7/2011 |

OTHER PUBLICATIONS

Office Action in corresponding Japanese Patent Application No. 2013-084396, dated Mar. 7, 2017, with translation (10 pages).

* cited by examiner

DISPLAY DEVICE

TECHNICAL FIELD

The present invention relates to a display device for displaying images.

BACKGROUND TECHNOLOGY

A display device provided with a backlight unit of an edge light type that irradiates light toward a back surface of a display panel, such as, for example, a liquid crystal television receiver or the like, is known (for example, see Patent Document 1).

This backlight unit of the edge light type is provided with a light guide plate, a light emitting diode (LED) bar, and a reflective sheet. The light guide plate is disposed so as to oppose the back surface of the display panel. The LED bar has a wiring substrate and a plurality of LEDs mounted to the wiring substrate. This LED bar is disposed so as to oppose a lateral surface of the light guide plate. The reflective sheet is disposed so as to cover a back surface of the light guide plate.

The backlight unit described above is provided inside an enclosure. The enclosure has a frame-like front cabinet that covers an outer peripheral portion of the display panel and a rear frame disposed so as to oppose the reflective sheet. A rib that protrudes toward the reflective sheet is provided across an entire periphery of the rear frame. The front cabinet and the rear frame are each formed of resin.

Furthermore, a frame-like mold frame for supporting the peripheral portion of the display panel is provided between the peripheral portion of the display panel and a peripheral portion of the light guide plate. A rib that protrudes toward a main surface (i.e., a surface on an opposite side of the back surface) of the light guide plate is provided across an entire periphery of the mold frame. The peripheral portion of the light guide plate is interposed between the rib of the rear frame and the rib of the mold frame, together with the reflective sheet. The light guide plate is thereby fixed to the enclosure.

RELATED ART DOCUMENTS

Patent Documents

[Patent Document 1] Japanese Unexamined Patent Application Publication No. 2012-208254

However, generally, resin has a property of expanding in a comparatively high environmental temperature and shrinking in a comparatively low environmental temperature. The rear frame formed of resin therefore has a tendency to expand or shrink according to an environmental temperature around the display device. As described above, because the reflective sheet is interposed between the rib of the rear frame and the rib of the mold frame along with the light guide plate, the rib of the rear frame pulls the reflective sheet when the rear frame expands or contracts. As a result, there is concern of flexion occurring in the reflective sheet.

SUMMARY OF THE INVENTION

One or more embodiments of the present invention provide a display device that can suppress a reflective sheet from flexing due to the environmental temperature around the display device.

According to one or more embodiments of the present invention, a display device may comprise: a display panel; a light source that emits light; a light guide plate comprising a lateral surface that receives the light, wherein the light source emits the light to the lateral surface from a main surface to a back surface of the display panel; a supporting member provided between a peripheral portion of the display panel and a peripheral portion of the light guide plate and that supports the peripheral portion of the display panel; a reflective sheet disposed so as to cover a back surface on an opposite side of the main surface of the light guide plate and that comprises an opening at a position corresponding to the peripheral portion of the light guide plate; and a back surface enclosure disposed so as to oppose the reflective sheet and that comprises: a first fixing part, wherein the peripheral portion of the light guide plate exposed through the opening of the reflective sheet is interposed between the first fixing part and the supporting member; and a second fixing part, wherein the peripheral portion of the light guide plate covered by the reflective sheet is interposed between the second fixing part and the supporting member.

According to one or more embodiments, the opening may be provided on the position corresponding to the peripheral portion of the light guide plate, and the first fixing part of the back surface enclosure interposes between the supporting member the peripheral portion of the light guide plate exposed though the opening. A gap may thereby be formed between the reflective sheet and the light guide plate near the opening of the reflective sheet, and a force that fixes the reflective sheet on the light guide plate may become comparatively small near the opening of the reflective sheet. As a result, when the back surface enclosure is formed of resin, for example, the second fixing part suppresses the reflective sheet from being pulled even when the back surface enclosure expands or contracts according to an environmental temperature around the display device, and flexion of the reflective sheet can therefore be suppressed from occurring.

For example, in a display device according to one or more embodiments of the present invention, a height of the first fixing part from the back surface enclosure may be higher than a height of the second fixing part from the back surface enclosure.

According to one or more embodiments, the gap between the reflective sheet and the light guide plate can be formed near the opening of the reflective sheet because the height of the first fixing part from the back surface enclosure is higher than the height of the second fixing part from the back surface enclosure.

For example, in a display device according to one or more embodiments of the present invention, a fastening member that mutually fastens the supporting member and the back surface enclosure may be configured to be provided, wherein the first fixing part and the opening of the reflective sheet may be disposed to correspond with a placement location of the fastening member.

According to one or more embodiments, the reflective sheet may be fixed with a comparatively large force to the light guide plate in a location where the fastening member mutually fastens the supporting member and the back enclosure. Because of this, a force with which the second fixing part pulls the reflective sheet becomes comparatively large near the placement location of the fastening member when the back surface enclosure expands or contracts according to the environmental temperature around the display device. According to one or more embodiments, the first fixing part can effectively suppress the force with which the second fixing part pulls the reflective sheet when the back enclosure expands or contracts according to the environmental temperature around the display device because the first fixing part is disposed to correspond with such placement location of the fastening member.

For example, in a display device according to one or more embodiments of the present invention, the first fixing part and the second fixing part may be configured to extend continuously along the peripheral portion of the light guide plate.

According to one or more embodiments, the first fixing part and the second fixing part can be configured from, for example, a rib that extends continuously along the peripheral portion of the light guide plate.

For example, in a display device according to one or more embodiments of the present invention, the first fixing part and the second fixing part may be configured to be disposed discontinuously along the peripheral portion of the light guide plate.

According to one or more embodiments, the first fixing part and the second fixing part can be configured from, for example, a boss (protrusion) disposed discontinuously along the peripheral portion of the light guide plate.

For example, in a display device according to one or more embodiments of the present invention, the back surface enclosure, the first fixing part, and the second fixing part may be configured to be formed by an integral molding of resin.

According to one or more embodiments, the back surface enclosure, the first fixing part, and the second fixing part can be formed by the integral molding of resin.

According to the display device according to one or more embodiments of the present invention, flexion of the reflective sheet due to the environmental temperature around the display device can be suppressed.

DETAILED DESCRIPTION OF EMBODIMENTS

Embodiments of the present invention will be described in detail below using drawings. Embodiments described below illustrate examples of the present invention. Numerical values, shapes, materials, components, disposed positions and connection modes of the components, and the like illustrated in the embodiments below are examples and not meant to limit the present invention. The present invention is specified by the scope of patent claims. Therefore, among the components in the embodiments below, components not described in the independent claims are not necessarily needed to achieve the present invention but are described as examples.

(First Example)
[Overall Configuration of the Display Device]

Figure 1:
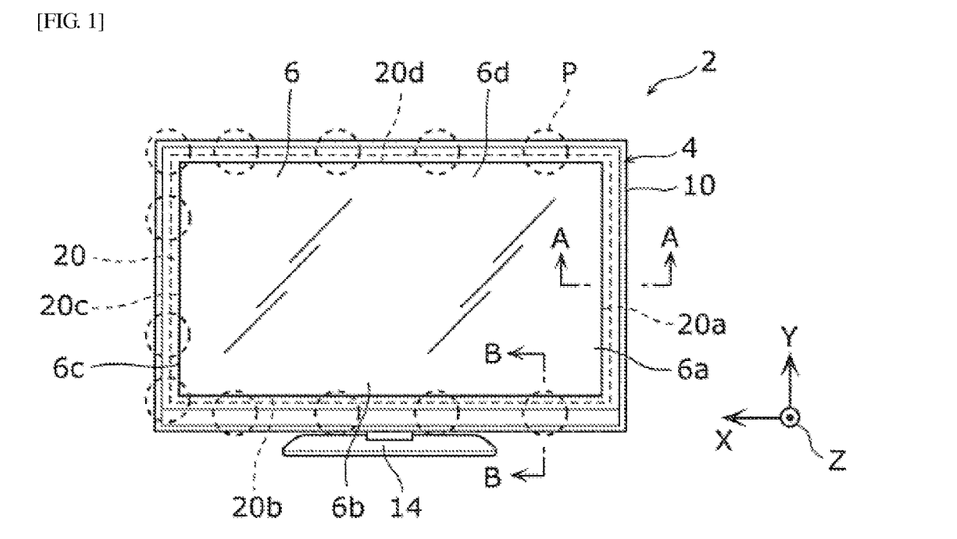
FIG. 1 is a diagram illustrating a front surface side of a display device according to one or more embodiments of a first example.
Figure 2:
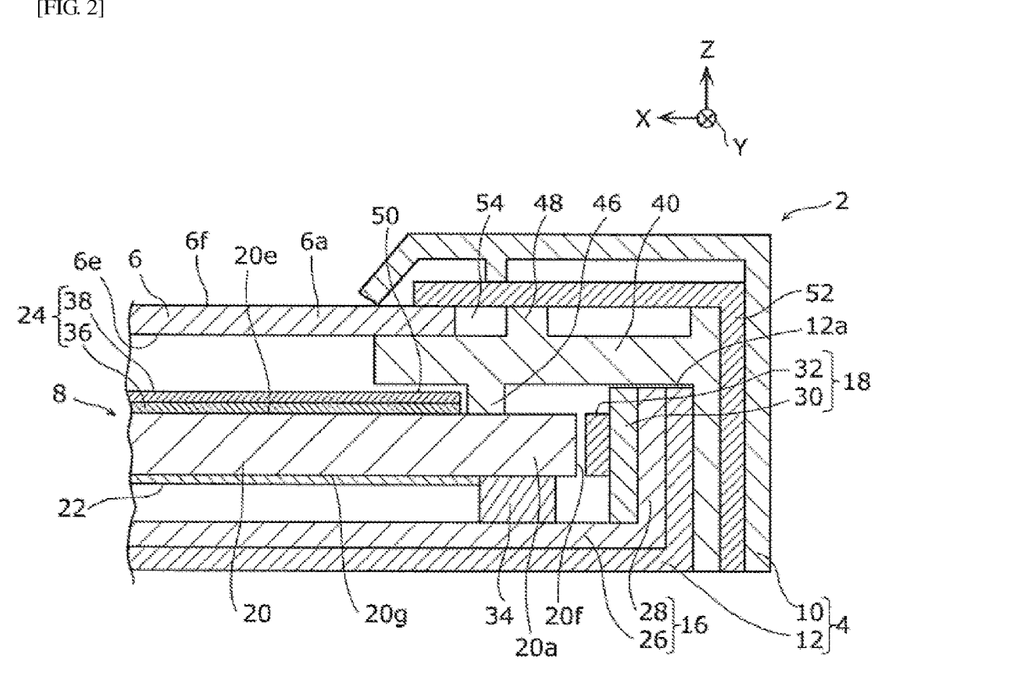
FIG. 2 is a partial cross-sectional view of the display device cut along the line A-A in FIG. 1 according to one or more embodiments of the first example.
Figure 3:
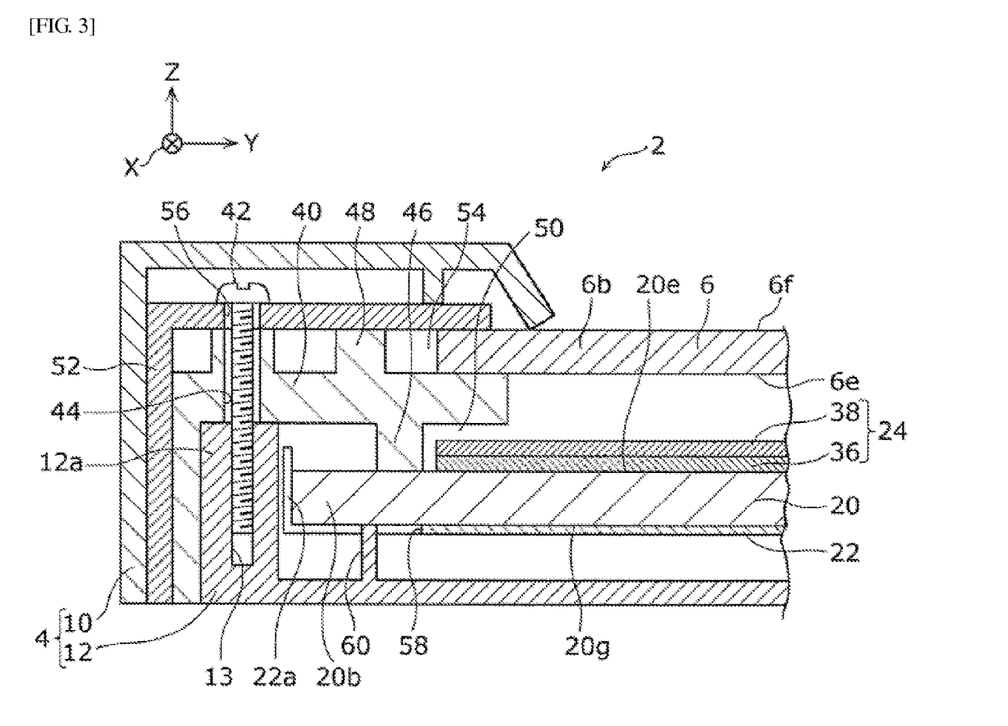
FIG. 3 is a partial cross-sectional view of the display device cut along the line B-B in FIG. 1 according to one or more embodiments of the first example.
Figure 4:
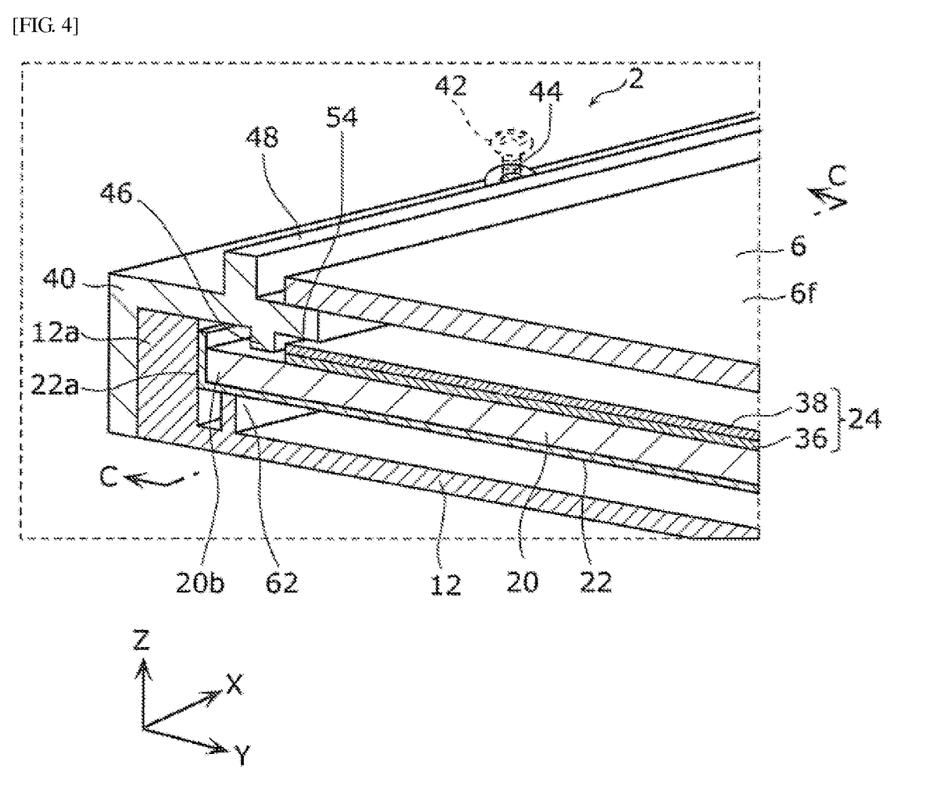
FIG. 4 is a partial cross-sectional perspective view of the display device cut along the line B-B in FIG. 1 according to one or more embodiments of the first example.

First, an overall configuration of the display device according to one or more embodiments of a first example of the present invention will be described with reference to FIGS. 1 to 4. FIG. 1 is a diagram illustrating a front surface side of the display device according to one or more embodiments of the first example. FIG. 2 is a partial cross-sectional view of the display device cut along the line A-A in FIG. 1. FIG. 3 is a partial cross-sectional view of the display device cut along the line B-B in FIG. 1. FIG. 4 is a partial cross-sectional perspective view of the display device cut along the line B-B in FIG. 1. A front cabinet 10 and a bezel 52 described below are not illustrated in FIG. 4 for convenience in the description.

As illustrated in FIGS. 1 and 2, a display device 2 is provided with an enclosure 4, a liquid crystal panel 6 (configuring a display panel) provided inside the enclosure 4, and a backlight unit 8. The display device 2 according to one or more embodiments of the first example is a liquid crystal television receiver provided with the backlight unit 8 of an edge light type.

The enclosure 4 is configured by a mutual combination of a front cabinet 10 and a rear frame 12 (configuring a back surface enclosure). The front cabinet 10 is configured in a frame shape and is disposed so as to cover four peripheral portions 6a to 6d of the liquid crystal panel 6. The rear frame 12 is disposed so as to oppose a back surface 6e of the liquid crystal panel 6 (i.e., so as to oppose a reflective sheet 22 that will be described below). A plurality of screw holes 13 are provided on an opening 12a of the rear frame 12 for fastening a screw 42 (configuring a fastening member) that will be described below. A stand 14 is mounted on a lower end portion of the rear frame 12 for supporting the enclosure 4 from below. The front cabinet 10 and the rear frame 12 are each formed of resin.

As illustrated in FIG. 2, an inner surface of the rear frame 12 supports a backlight unit 8. The backlight unit 8 irradiates light toward the back surface 6e of the liquid crystal panel 6. The backlight unit 8 has a heat sink 16, a LED bar 18, a light guide plate 20, a reflective sheet 22, and an optical sheet 24.

The heat sink 16 has a tabular heat radiating part 26 and a mounting part 28 that extends substantially vertically toward the liquid crystal panel 6 from an end portion of the heat radiating part 26. That is, a cross-sectional shape of the heat sink 16 is substantially L-shaped. The heat radiating part 26 is mounted to the inner surface of the rear frame 12 by screws (not illustrated). The mounting part 28 is disposed to correspond with a peripheral portion 20a, which is in a short direction, from among four peripheral portions 20a to 20d of the light guide plate 20. The heat sink 16 is formed of metal with high conductivity, such as aluminum or the like.

The LED bar 18 has a wiring substrate 30 and a plurality of LEDs 32 (each of the plurality of LEDs 32 configures a light source). The wiring substrate 30 is configured in an elongated plate shape. The plurality of LEDs 32 is mounted on the wiring substrate 30 along a long direction thereof, in one row, and with gaps therebetween. Each of the plurality of LEDs 32 is, for example, an LED of a chip type. The wiring substrate 30 is mounted to the mounting part 28 of the heat sink 16 by a double-sided tape (not illustrated) having thermal conductivity. The wiring substrate 30 is formed of metal with high conductivity, such as aluminum or the like.

The light guide plate 20 is configured in a rectangular shape. A main surface 20e of the light guide plate 20 is disposed so as to oppose the back surface 6e of the liquid crystal panel 6. A lateral surface 20f of the peripheral portion 20a in the short direction of the light guide plate 20 is disposed so as to oppose each of the plurality of LEDs 32. As illustrated in FIG. 2, the peripheral portion 20a in the short direction of the light guide plate 20 (that is, a peripheral portion in a region wherein the backlight unit 8 is disposed) is supported by the heat radiating part 26 of the heat sink 16 via a cushion member 34 formed of, for example, a rubber material or the like. Moreover, each of the remaining three peripheral portions 20b to 20d of the light guide plate 20 (i.e., the peripheral portions in a region wherein the backlight unit 8 is not disposed), as illustrated in FIGS. 3 and 4, is supported by a plurality of first fixing parts 60 and a plurality of second fixing parts 62 provided on the inner surface of the rear frame 12. A configuration of each of the plurality of first fixing parts 60 and the plurality of second fixing parts 62 will be described below. The light guide plate 20 is formed of, for example, acrylic resin or the like.

The reflective sheet 22 is disposed so as to cover a back surface 20g (i.e., a surface on an opposite side of the main surface 20e) of the light guide plate 20. The reflective sheet 22 has an optical function that reflects light incident from the lateral surface 20f of the light guide plate 20 toward the main surface 20e. As illustrated in FIGS. 3 and 4, an end portion 22a of the reflective sheet 22 is bent to a light guide plate 20 side and covers a lateral surface of each of the three peripheral portions 20b to 20d of the light guide plate 20. The display device 2 according to one or more embodiments of the first example has a characteristic of fixing the reflective sheet 22 to the light guide plate 20. A fixing structure of the reflective sheet 22 will be described below.

The optical sheet 24 includes a diffusion sheet 36 and a lens sheet 38. The diffusion sheet 36 and the lens sheet 38 are disposed in a mutually overlaid state so as to cover the main surface 20e of the light guide plate 20. The diffusion sheet 36 has an optical function that diffuses light incident from the main surface 20e of the light guide plate 20. The lens sheet 38 has an optical function that guides the light diffused by the diffusion sheet 36 to the back surface 6e of the liquid crystal panel 6.

As illustrated in FIGS. 2 to 4, a mold frame 40 (configuring a supporting member) for supporting the four peripheral portions 6a to 6d of the liquid crystal panel 6 from the back surface 6e is mounted to the opening 12a of the rear frame 12. The mold frame 40 is configured in, for example, a frame shape, and is disposed between the four peripheral portions 6a to 6d of the liquid crystal panel 6 and the four peripheral portions 20a to 20d of the light guide plate 20. As illustrated in FIG. 3, a plurality of through holes 44 for inserting the screw 42 is provided on the mold frame 40. A first rib 46 is provided on a rear surface (i.e., a surface on the light guide plate 20 side) of the mold frame 40, and a second rib 48 is provided on a front surface (i.e., a surface on a liquid crystal panel 6 side) of the mold frame 40.

The first rib 46 protrudes toward the main surface 20e of the light guide plate 20. The first rib 46 extends along each of the four peripheral portions 20a to 20d of the light guide plate 20 and contacts the main surface 20e of the light guide plate 20. The first rib 46 forms a space 50 between the mold frame 40 and the four peripheral portions 20a to 20d of the light guide plate 20. Four peripheral portions of the diffusion sheet 36 and the lens sheet 38, respectively, are disposed in this space 50.

The second rib 48 protrudes toward a bezel 52 that will be described below. The second rib 48 is for forming a space 54 between the mold frame 40 and the bezel 52. The four peripheral portions 6a to 6d of the liquid crystal panel 6 are disposed in this space 54.

The liquid crystal panel 6 is configured in a rectangular shape. An inner peripheral portion (i.e., a portion of the mold frame 40 further inward than the second rib 48) of the mold frame 40 supports the four peripheral portions 6a to 6d of the liquid crystal panel 6. An image is displayed on the liquid crystal panel 6 by irradiating the light emitted from the backlight unit 8 on the back surface 6e of the liquid crystal panel 6.

The four peripheral portions 6a to 6d on a main surface 6f (i.e., the side on the opposite side of the back surface 6e of the liquid crystal panel 6) side of the liquid crystal panel 6 are covered by the bezel 52. The bezel 52 is configured in, for example, a frame shape. A plurality of through holes 56 for inserting the screw 42 is provided on the bezel 52. The screw 42 is fastened to each of the plurality of screw holes 13 of the rear frame 12 through each of the plurality of through holes 56 of the bezel 52 and each of the plurality of through holes 44 of the mold frame 40. The bezel 52 and the mold frame 40 are thereby respectively fastened to the opening 12a of the rear frame 12 by a plurality of screws 42. Moreover, the four peripheral portions 6a to 6d of the liquid crystal panel 6 are fixed between the bezel 52 and the mold frame 40. In FIG. 1, a region P surrounded by the circle of the dashed line represents a placement location of the plurality of screws 42. As illustrated in FIG. 1, the plurality of screws 42 is disposed, for example, in four locations of the peripheral portions 20b to 20d of the light guide plate 20, respectively.

Screws (not illustrated) mount the front cabinet 10 to the rear frame 12 so as to cover the bezel 52 and the mold frame 40.

Next, an operation of the display device 2 described above will be briefly described. Lighting the plurality of LEDs 32 emits light from the plurality of LEDs 32. The light from the plurality of LEDs 32 becomes incident to the lateral surface 20f of the light guide plate 20. The light incident to the lateral surface 20f of the light guide plate 20 is propagated inside the light guide plate 20 while being reflected by the reflective sheet 22 and is emitted from the main surface 20e of the light guide plate 20. The light emitted from the main surface 20e of the light guide plate 20 becomes incident to the back surface 6e of the liquid crystal panel 6 after passing through the diffusion sheet 36 and the lens sheet 38.

The plurality of LEDs 32 generates heat when the plurality of LEDs 32 is lighted. Heat from the plurality of LEDs 32 is transmitted to the heat radiating part 26 via the wiring substrate 30, the double-sided tape, and the mounting part 28. Heat transmitted to the heat radiating part 26 is radiated into the air.

[Fixing Structure of the Reflective Sheet]

Figure 5:
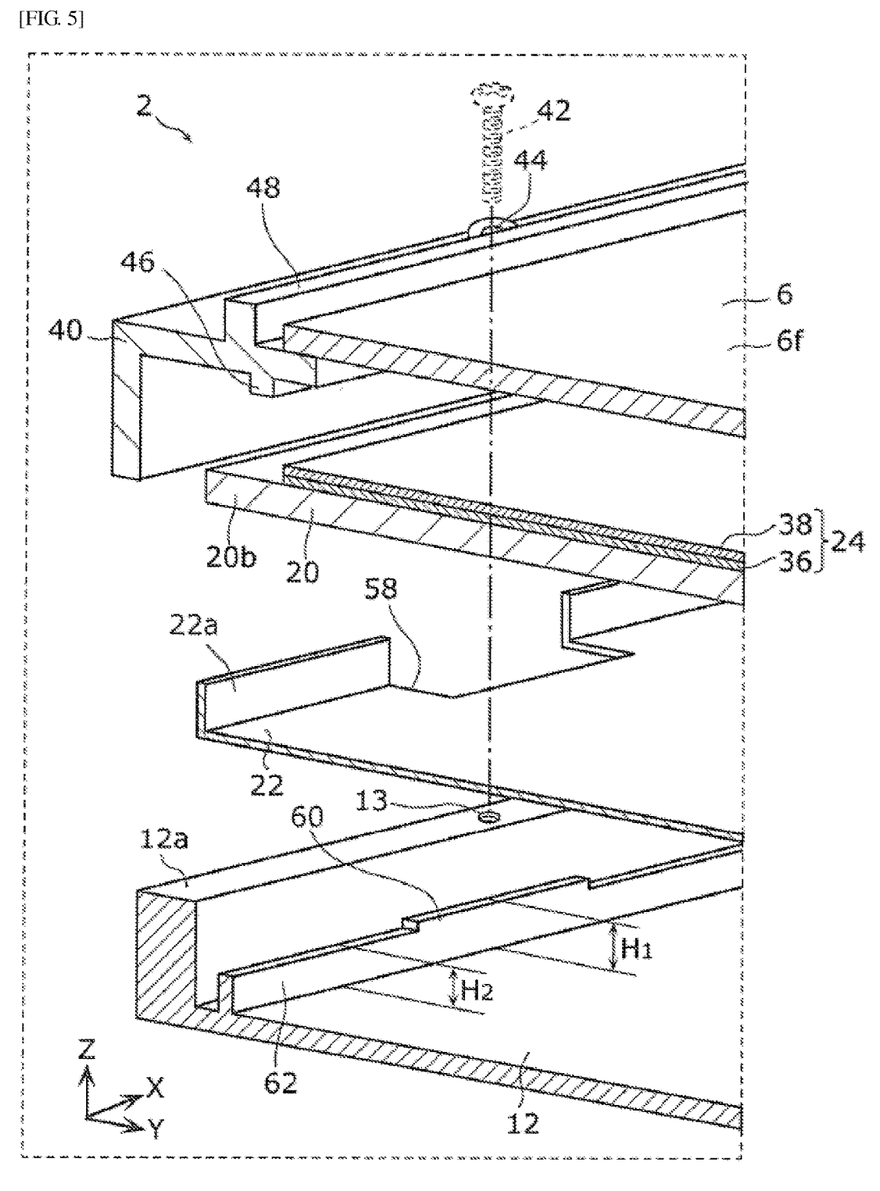
FIG. 5 is a partial cross-sectional exploded perspective view illustrating an exploded portion of the display device in FIG. 4 according to one or more embodiments of the first example
Figure 6:
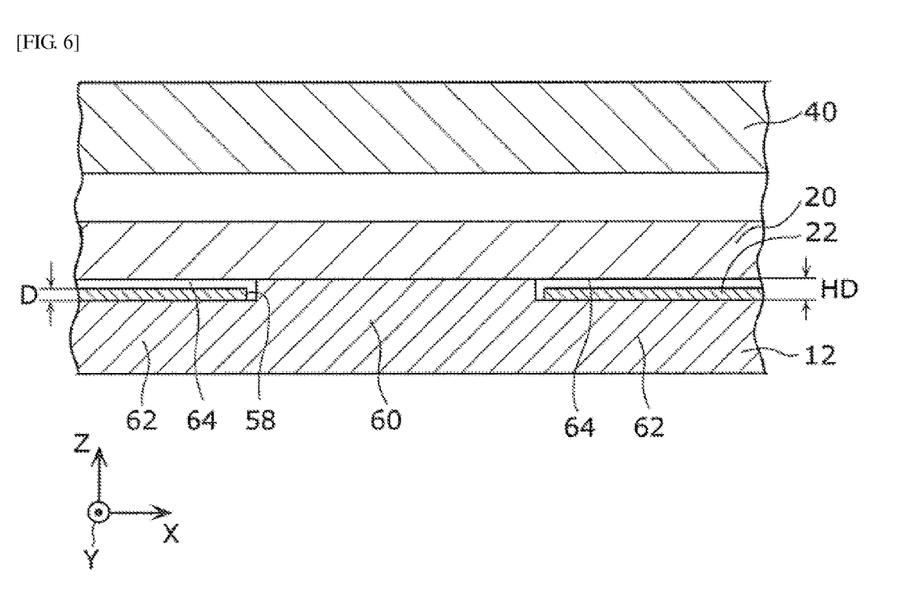
FIG. 6 is a partial cross-sectional view of the display device cut along the line C-C in FIG. 4 according to one or more embodiments of the first example.

Next, a structure that fixes the reflective sheet 22 to the light guide plate 20, which is a characteristic configuration of the display device 2 according to one or more embodiments of the first example, will be described with reference to FIGS. 5 and 6. FIG. 5 is a partial cross-sectional exploded perspective view illustrating an exploded portion of the display device in FIG. 4. FIG. 6 is a partial cross-sectional view of the display device cut along the line C-C in FIG. 4. The front cabinet 10 and the bezel 52 are not illustrated in FIGS. 5 and 6 for convenience in the description.

As illustrated in FIG. 5, a plurality of openings 58 are provided on positions of the reflective sheet 22 corresponding to the three peripheral portions 20b to 20d of the light guide plate 20. Each of the plurality of openings 58 is disposed to correspond with the placement locations of the screw 42 described above. According to one or more embodiments of the first example, each of the plurality of openings 58 is configured as a rectangular cutout that extends substantially vertically relative to the end portion 22a of the reflective sheet 22.

The plurality of first fixing parts 60 and the plurality of second fixing parts 62 are provided on the inner surface of the rear frame 12. According to one or more embodiments of the first example, the plurality of first fixing parts 60 and the plurality of second fixing parts 62 are, overall, configured from a rib that extends continuously along the three peripheral portions 20b to 20d of the light guide plate 20. The rear frame 12, the plurality of first fixing parts 60, and the plurality of second fixing parts 62 are, for example, formed by an integral molding of resin.

A height H1 from the inner surface of the rear frame 12 to the first fixing part 60 is higher than a height H2 from the inner surface of the rear frame 12 to the second fixing part 62. A difference HD between the height H1 and the height H2 is, for example, 0.3 mm, which is about 0.1 mm greater than a thickness D (about 0.2 mm) of the reflective sheet 22.

Each of the plurality of first fixing portions 60 is disposed to correspond with the opening 58 of the reflective sheet 22 described above. Meanwhile, each of the plurality of second fixing portions 62 is disposed to correspond with a position other than the opening 58 of the reflective sheet 22 described above. Therefore, the plurality of first fixing parts 60 and the plurality of second fixing parts 62 are alternately disposed in a row along the three peripheral portions 20b to 20d of the light guide plate 20.

The peripheral portions 20b to 20d of the light guide plate 20 covered by the reflective sheet 22 are interposed between the plurality of second fixing parts 62 and the first rib 46 of the mold frame 40. The reflective sheet 22 is thereby fixed between the first rib 46 of the mold frame 40 and the plurality of second fixing parts 62, along with the light guide plate 20.

Meanwhile, the peripheral portions 20b to 20d of the light guide plate 20 exposed through the opening 58 of the reflective sheet 22 are interposed between the plurality of first fixing parts 60 and the first rib 46 the mold frame 40. As described above, the height H1 of the first fixing part 60 is higher than the height H2 of the second fixing part 62. As illustrated in FIG. 6, a gap 64 is thereby formed between the reflective sheet 22 and the light guide plate 20 near the opening 58 of the reflective sheet 22.

[Effects]

Next, effects that can be obtained by the display device 2 according to one or more embodiments of the first example will be described. As described above, the gap 64 is formed between the reflective sheet 22 and the light guide plate 20 near the opening 58 of the reflective sheet 22. Because of this, a force that fixes the reflective sheet 22 to the light guide plate 20 becomes comparatively small near the opening 58 of the reflective sheet 22. The second fixing part 62 thereby suppress the reflective sheet 22 from being pulled even when the rear frame 12 formed of resin expands or contracts according to the environmental temperature around the display device 2. As a result, flexion of the reflective sheet 22 can be suppressed from occurring.

(Second Example)

Figure 7:
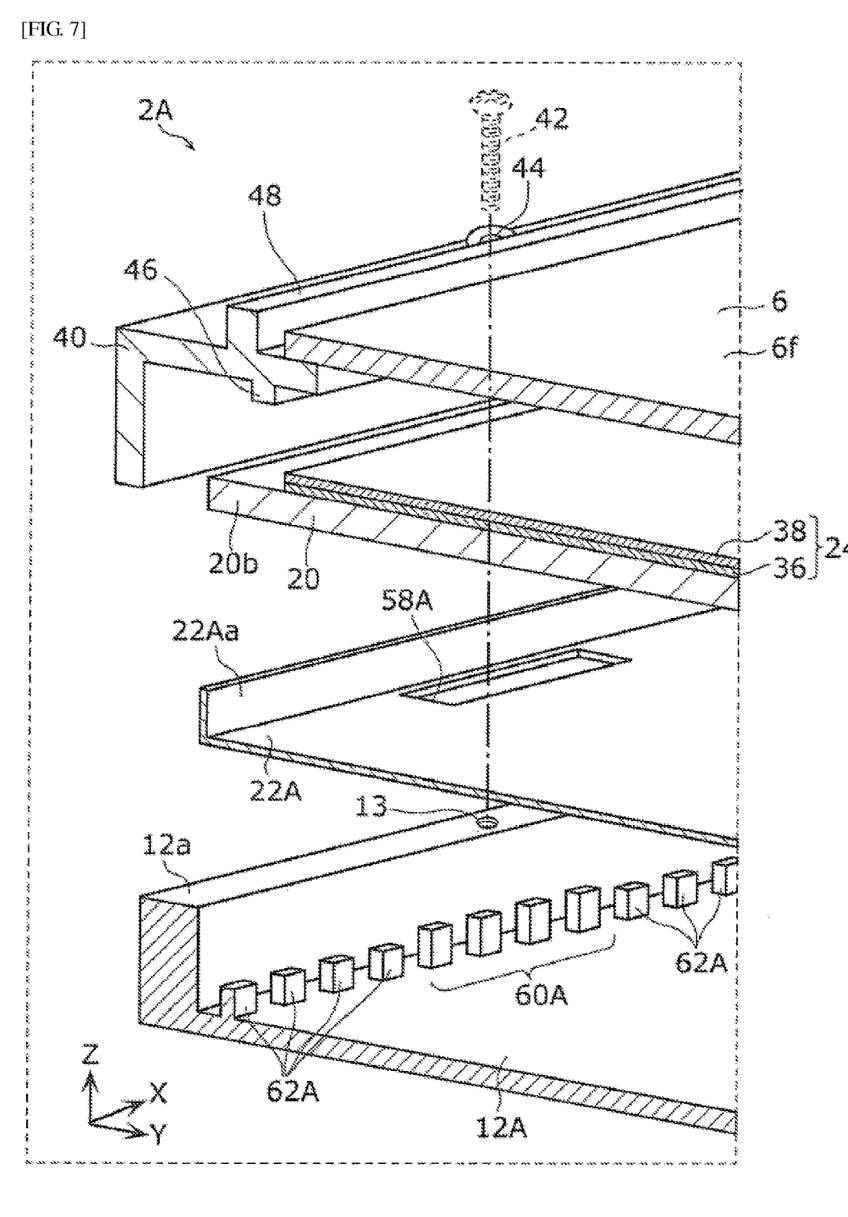
FIG. 7 is a partial cross-sectional exploded perspective view illustrating an exploded portion of a display device according to one or more embodiments of a second example.

Next, a configuration of a display device according to one or more embodiments of a second example will be described with reference to FIG. 7. FIG. 7 is a partial cross-sectional exploded perspective view illustrating an exploded portion of the display device according to one or more embodiments of the second example. According to one or more embodiments of the second example, the same reference numerals will be attached to the same or similar components as the first example described above, and explanations thereof will be omitted.

As illustrated in FIG. 7, in a display device 2A according to one or more embodiments of the second example, a plurality of openings 58A provided on the reflective sheet 22A is configured from rectangular through holes. The plurality of openings 58A is disposed near an end portion 22Aa of the reflective sheet 22A.

Furthermore, a plurality of first fixing parts 60A and a plurality of second fixing parts 62A are each configured from a boss (protrusion) disposed discontinuously along three peripheral portions 20b to 20d of a light guide plate 20. As in the first example described above, a height from an inner surface of a rear frame 12A to the first fixing part 60A is higher than a height from the inner surface of the rear frame 12A to the second fixing part 62A. Each of the plurality of first fixing portions 60A is disposed to correspond with the opening 58A of the reflective sheet 22A described above. Meanwhile, each of the plurality of second fixing portions 62A is disposed to correspond with a position other than the opening 58A of the reflective sheet 22A described above.

Some of the same effects as the first example can be obtained by the display device 2A according to one or more embodiments of the second example by the configuration described above.

The display device relating to the first and second examples are described above, but the present invention is not limited to these examples or embodiments. For example, various the embodiments described above may be combined, respectively.

In the embodiments described above, a case where the display device is the liquid crystal television receiver is described, but other than the liquid crystal television receiver, the display device may be, for example, a liquid crystal monitor or the like for a personal computer.

In the embodiments described above, the rear frame, the plurality of first fixing parts, and the plurality of second fixing parts are formed by the integral molding of resin. The embodiments described above, however, are not limited thereto, and may, for example, form the rear frame from resin and form the plurality of first fixing parts and the plurality of second fixing parts from a rubber material or the like. In this case, the plurality of first fixing parts and the plurality of second fixing parts are each mounted to the rear frame with an adhesive or the like. Alternatively, the rear frame, the plurality of first fixing parts, and the plurality of second fixing parts can be formed of a material besides resin that expands or contracts according to an environmental temperature.

In the embodiments described above, the height of the first fixing part from the inner surface of the rear frame is configured to be higher than the height of the second fixing part from the inner surface of the rear frame. In place of such configuration, the height of the first fixing part and the height of the second fixing part may be configured to be the same height. In this case, a thickness of a portion of the light guide plate corresponding to a portion other than the opening of the reflective sheet is configured to be greater than a thickness of a portion of the light guide plate corresponding to the opening of the reflective sheet.

The display device of the present invention is applicable, for example, as a liquid crystal television receiver or as a liquid crystal monitor or the like for a personal computer. Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims

EXPLANATION OF REFERENCE NUMERALS 2, 2A Display device
4 Enclosure
6 Liquid crystal panel
6a, 6b, 6c, 6d Peripheral portion
6e Back surface
6f Main surface
8 Backlight unit
10 Front cabinet
12, 12A Rear frame
12a Opening
13 Screw hole
14 Stand
16 Heat sink
18 LED bar
20 Light guide plate
20a, 20b, 20c, 20d Peripheral portion
20e Main surface
20f Lateral surface
20g Back surface
22, 22A Reflective sheet
22a, 22Aa End portion
24 Optical sheet
26 Heat radiating part
28 Mounting part
30 Wiring substrate
32 LED
34 Cushion member
36 Diffusion sheet
38 Lens sheet
40 Mold frame
42 Screw
44, 56 Through hole
46 First rib
48 Second rib
50, 54 Space
52 Bezel
58, 58A Opening
60, 60A First fixing part
62, 62A Second fixing part
64 Gap
P Region

What is claimed is:

1. A display device, comprising:
   a display panel;
   a light source that emits light;
   a light guide plate comprising a lateral surface that receives the light, wherein the light source emits the light to the lateral surface from a main surface to a back surface of the display panel;
   a reflective sheet that covers a back surface on an opposite side of the main surface of the light guide plate and that comprises an opening at a position corresponding to a peripheral portion of the light guide plate;
   a back surface enclosure formed of resin;
   a supporting member provided between a peripheral portion of the display panel and a peripheral portion of the light guide plate and that supports the peripheral portion of the display panel; and
   a screw that mutually fastens the supporting member and the back surface enclosure,
   wherein the back surface enclosure opposes the reflective sheet and comprises:
      a first fixing part that contacts a back surface of the light guide plate through the opening of the reflective sheet; and
      a second fixing part that contacts a surface of the reflective sheet,
   wherein a difference between a height of the first fixing part from an inner surface of the back surface enclosure to the back surface of the light guide plate and a height of the second fixing part from the inner surface is larger than a thickness of the reflective sheet,
   wherein a first portion of the back surface of the light guide plate facing the first fixing part and a second portion of the back surface of the light guide plate facing the second fixing part are co-planar, and
   wherein the first fixing part and the opening of the reflective sheet are respectively disposed to correspond with a placement location of the screw.

2. The display device according to claim 1, wherein a height of the first fixing part from the back surface enclosure is higher than a height of the second fixing part from the back surface enclosure.

3. The display device according to claim 1, wherein the first fixing part and the second fixing part extend continuously along a peripheral portion of the light guide plate.

4. The display device according to claim 1, wherein the first fixing part and the second fixing part are disposed discontinuously along the peripheral portion of the light guide plate.

5. The display device according to claim 1, wherein the back surface enclosure, the first fixing part, and the second fixing part are integrally molded from resin.

6. The display device according to claim 2, wherein the first fixing part and the second fixing part extend continuously along a peripheral portion of the light guide plate.

7. The display device according to claim 2, wherein the first fixing part and the second fixing part are disposed discontinuously along the peripheral portion of the light guide plate.

8. The display device according to claim 2, wherein the back surface enclosure, the first fixing part, and the second fixing part are integrally molded from resin.

9. The display device according to claim 3, wherein the back surface enclosure, the first fixing part, and the second fixing part are integrally molded from resin.

10. The display device according to claim 4, wherein the back surface enclosure, the first fixing part, and the second fixing part are integrally molded from resin.

11. The display device according to claim 1, wherein the opening is one of a plurality of openings,
the first fixing part is one of a plurality of first fixing parts,
the second fixing part is one of a plurality of second fixing parts, and the plurality of first fixing parts and the plurality of second fixing parts are alternately disposed.

12. The display device according to claim 1, wherein the opening, the first fixing part, and the second fixing part are disposed at a position different from a position around the lateral surface.

13. The display device according to claim 1, wherein the peripheral portion of the light guide plate exposed through the opening of the reflective sheet is interposed between the first fixing part and the supporting member, and the peripheral portion of the light guide plate covered by the reflective sheet is interposed between the second fixing part and the supporting member.

\* \* \* \* \*